US005708355A

United States Patent [19]

Schrey

[11] Patent Number: 5,708,355

[45] Date of Patent: Jan. 13, 1998

[54] METHOD OF IDENTIFYING THE IMPACT OF AN ARMATURE ONTO AN ELECTROMAGNET ON AN ELECTROMAGNETIC SWITCHING ARRANGEMENT

[75] Inventor: Ekkehard Schrey, Aachen, Germany

[73] Assignee: FEV Motorentechnik GmbH & Co. KG, Aachen, Germany

[21] Appl. No.: 701,450

[22] Filed: Aug. 22, 1996

[30] Foreign Application Priority Data

Aug. 22, 1995 [DE] Germany ........................ 195 30 798.4

[51] Int. Cl.[6] ................................ G05F 1/40; G01B 7/14

[52] U.S. Cl. ............... 323/282; 324/207.16; 324/207.24; 335/255

[58] Field of Search ............................ 323/282; 335/228, 335/255, 256; 91/248, 459; 324/207.16, 207.24

[56] References Cited

U.S. PATENT DOCUMENTS 5,424,637 6/1995 Oudyn et al. ...................... 324/207.16
5,481,187 1/1996 Marcott et al. .................... 324/207.16
5,548,204 8/1996 Armstrong, II et al. ............... 323/282
5,600,234 2/1997 Hastings et al. ........................ 323/282

FOREIGN PATENT DOCUMENTS 3024109 6/1980 Germany .

*Primary Examiner*—Stuart N. Hecker
*Attorney, Agent, or Firm*—Spencer & Frank

[57] ABSTRACT

A method of controlling an electromagnetic actuator having at least one electromagnet and an armature that can be moved by generated magnetic forces in a direction counter to the force of a restoring spring associated with the electromagnet, with the armature acting on a control element. The supply of current to the electromagnet in order to initiate the armature movement is effected by a linear regulator that regulates the coil current to a constant value, via a control member, prior to the anticipated impact of the armature on the pole face of the electromagnet. An identifying signal for armature impact is derived from changes in the control variable of the regulator (control current or control voltage) when the armature impacts during the constant-current phase.

4 Claims, 5 Drawing Sheets

METHOD OF IDENTIFYING THE IMPACT OF AN ARMATURE ONTO AN ELECTROMAGNET ON AN ELECTROMAGNETIC SWITCHING ARRANGEMENT

REFERENCE TO RELATED APPLICATIONS

This application claims the priority of German application Ser. No. 19530798.4, filed Aug. 22, 1995, which is incorporated herein by reference.

BACKGROUND OF THE INVENTION

The present invention relates to a method of identifying and controlling the impact of an armature onto an electromagnet of an electromagnetic switching arrangement. More particularly, the present invention relates to a method of controlling an electromagnetic actuator having at least one electromagnet and an armature that can be moved by magnetic forces in a direction counter to the force of a restoring spring associated with the electromagnet, and with the armature acting on a control element to move same to a desired position.

Electromagnetic switching arrangements comprising at least one electromagnet and an armature which acts on a control element and which can be moved by magnetic forces in a direction counter to the force of a restoring spring associated with the electromagnet are often required to maintain high timing precision. This is necessary, for example, for an electromagnetic actuator which actuates a cylinder valve in a piston-type internal combustion engine. With electromagnetic actuators it is possible to control the cylinder valves such that a free and therefore adaptable control is effected for the flow-in and flow-out of the working medium, so that the work process can be optimally influenced according to the respectively necessary operating conditions. The course over time of the control has a significant influence on the various parameters, for example, the status of the work medium in the intake region, in the work chamber and in the discharge region, as well as on the processes in the work chamber itself. Because piston-type internal combustion engines operate in an unsteady manner with widely-varying operating states, the variable control of the cylinder valves that is possible with electromagnetic actuators is advantageous. This is known from, for example, German Patent No. DE-C-30 24 109.

The necessary timing precision, which is particularly necessary for controlling the engine performance for the intake valves, represents a significant problem in controlling electromagnetic actuators of this type. A precise control of time is impeded by manufacturing-dictated tolerances, appearances of wear during operation and different operating states, for example, changing load requirements and changing operating frequencies, because these external influences can influence time-relevant parameters of the overall system.

The time of impact can be detected fairly precisely in an electromagnetic actuator having two holding magnets that define respective end positions for the armature. The methods used for this, however, require a relatively costly detection circuit for determining the variables significant for impact from the current or voltage path of the respective electromagnet attracting the armature. Because this outlay is an obstacle to an economical application, the object of the invention is to provide a method of detecting the time of impact with the smallest possible outlay for circuitry.

SUMMARY OF THE INVENTION

In accordance with the method of the invention, this object is accomplished in that the electromagnet is supplied with current via a linear regulator in order to initiate the armature movement, which regulator regulates the coil current to a constant value via a control element at a time prior to the anticipated time of impact of the armature onto the pole face of the electromagnet, and that an identifying signal for armature impact is derived from changes in the control variable of the regulator (control current or control voltage) when the armature impacts during the constant-current phase. Surprisingly, it has been seen that the identifying signal for armature impact can be derived directly from the regulator itself without an additional detection circuit. It is of great advantage that the voltage is influenced by the magnet coil at the capturing magnet when the armature impacts the pole face during the constant-current phase, and that this change in voltage has a retroactive effect on the control variable at the linear regulator, and changes it. This presents the possibility that the identifying signal for the armature impact and a control signal for controlling the actuator, which can be derived from the identifying signal, can be derived directly, without an additional outlay for circuitry.

In one preferred embodiment of the invention, the identifying signal is derived from the circuit element used for the D-component when using a PID regulator or controller.

BRIEF DESCRIPTION OF THE DRAWINGS

The method of the invention is described below in conjunction with schematic drawings.

DETAILED DESCRIPTION OF THE PREFERRED EMBODIMENT

Figure 5:
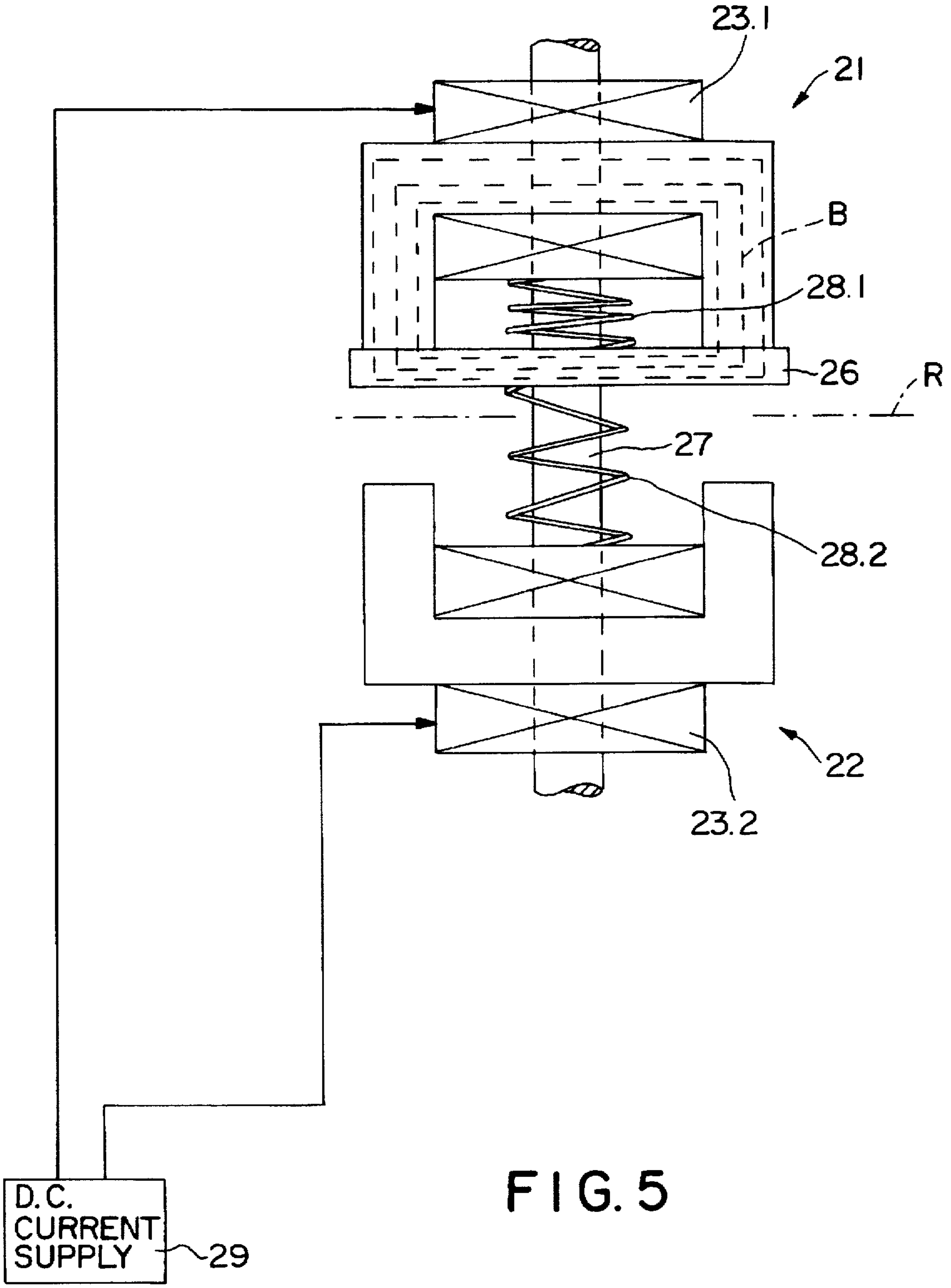
FIG. 5 is a schematic representation of an embodiment of an electromagnetic actuator of the general type to which the present invention pertains.

Turning first to FIG. 5, there is shown an electromagnetic actuator of the general type to which the present invention pertains, for example, for operating gas-exchange or cylinder valves in internal combustion engines. As shown in FIG. 5, the actuator comprises a magnetic armature 26 which is connected to and controls the relevant internal combustion engine valve via a rod 27, and which normally occupies its inoperative or neutral position R between two electromagnets 21 and 22 due to spring forces caused by restoring springs 28.1 and 28.2 when the respective electromagnet coils 23.1 and 23.2 are without current. To move the rod 27, and thus the attached valve, the armature 26 is alternatingly attracted to one or the other electromagnet by the alternate energization of the electromagnets, causing the resulting generated magnetic force to move the armature 26 in a direction counter to the force of the associated respective restoring spring 28.1 or 28.2, with the result that the armature 26 impacts on the pole face of the magnetic yoke of the respective electromagnet, and thus is brought into one or the other switching position. In gas-exchange valves, this corresponds to the open or closed position, respectively, of the valve. To operate the valve, that is, to effect a movement from one switching position into the other, the holding or retaining current at the respective holding coil 23.1 or 23.2 supplied by a d.c. current source 29, linearly regulated according to the present invention, is shut off. Consequently, the holding force of the electromagnet ceases under the spring force, and the armature 26 begins to move, accelerated by the spring force. After the armature has passed through its neutral or inoperative position, its movement is slowed by the spring force of the oppositely-located spring 28.1 or 28.2. Now, in order to capture and hold the armature 26 in the other switching position, the other electromagnet 21 or 22 is supplied with current. It should be noted that although the illustrated actuator has two opposed electromagnets, it may if desired contain only a single electromagnet, depending on the desired use.

Figure 1A:
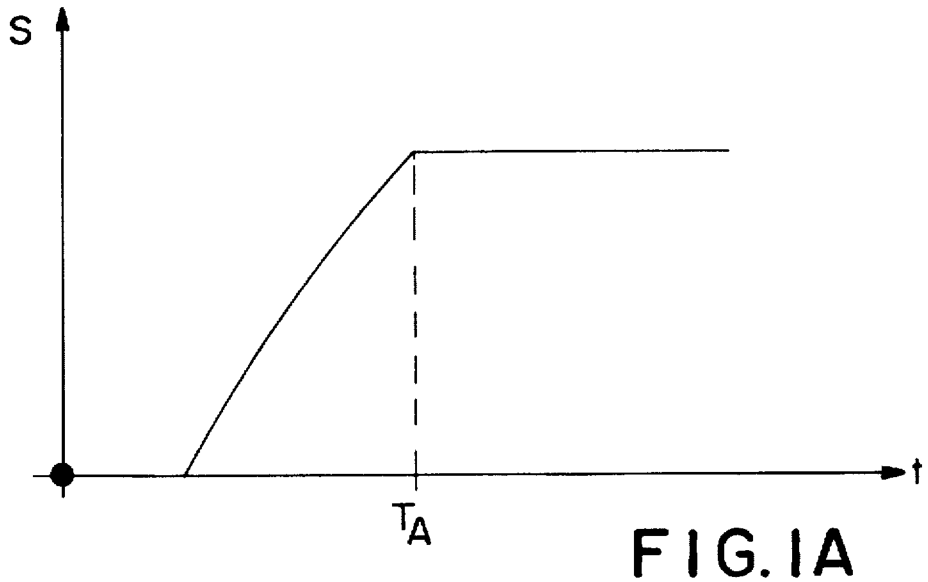
FIGS. 1*a*, 1*b* and 1*c* show respectively, the armature stroke and the path of current and voltage as a function of the armature stroke.
Figure 1B:
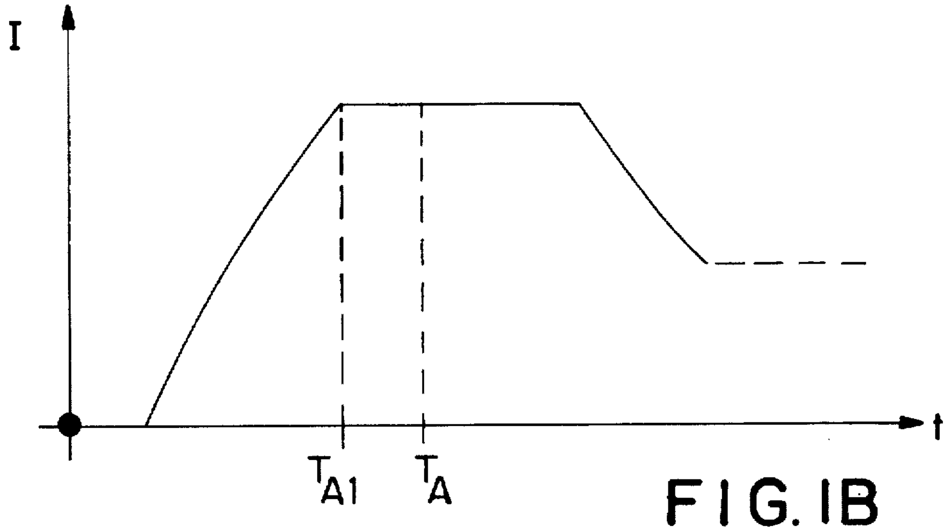

If, in an actuator of the type described above, the armature 26 is moved out of the initial or neutral position R defined by a restoring spring and in the direction of the pole face of the electromagnet until it comes in contact with the pole face, e.g., into contact with the pole face of electromagnet 21 as shown, the course of the stroke path S shown in FIG. 1*a* results as a function of the time t. To achieve this movement, the electromagnet 21 is charged with a linearly increasing current. According to the invention, the linear increase in current of the electromagnet is held at a constant value prior to the anticipated impact time $T_A$ of the armature onto the pole face, as shown in FIG. 1*b*.

Figure 1C:
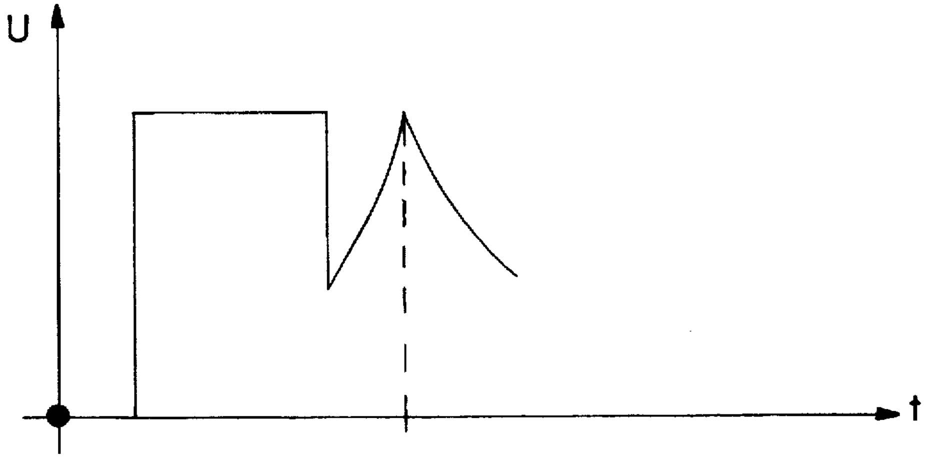

As can be seen in the associated voltage diagram of FIG. 1*c*, the voltage at the coil 23.1 of the electromagnet drops when the constant value for the current is set, but increases to a higher value when the armature 26 approaches the pole face of the electromagnet due to the change in magnetic flux caused by the approach. Finally, as shown, the voltage at the coil of the electromagnet drops again following impact, at time $T^A$, of the armature onto the pole face.

Figure 2:
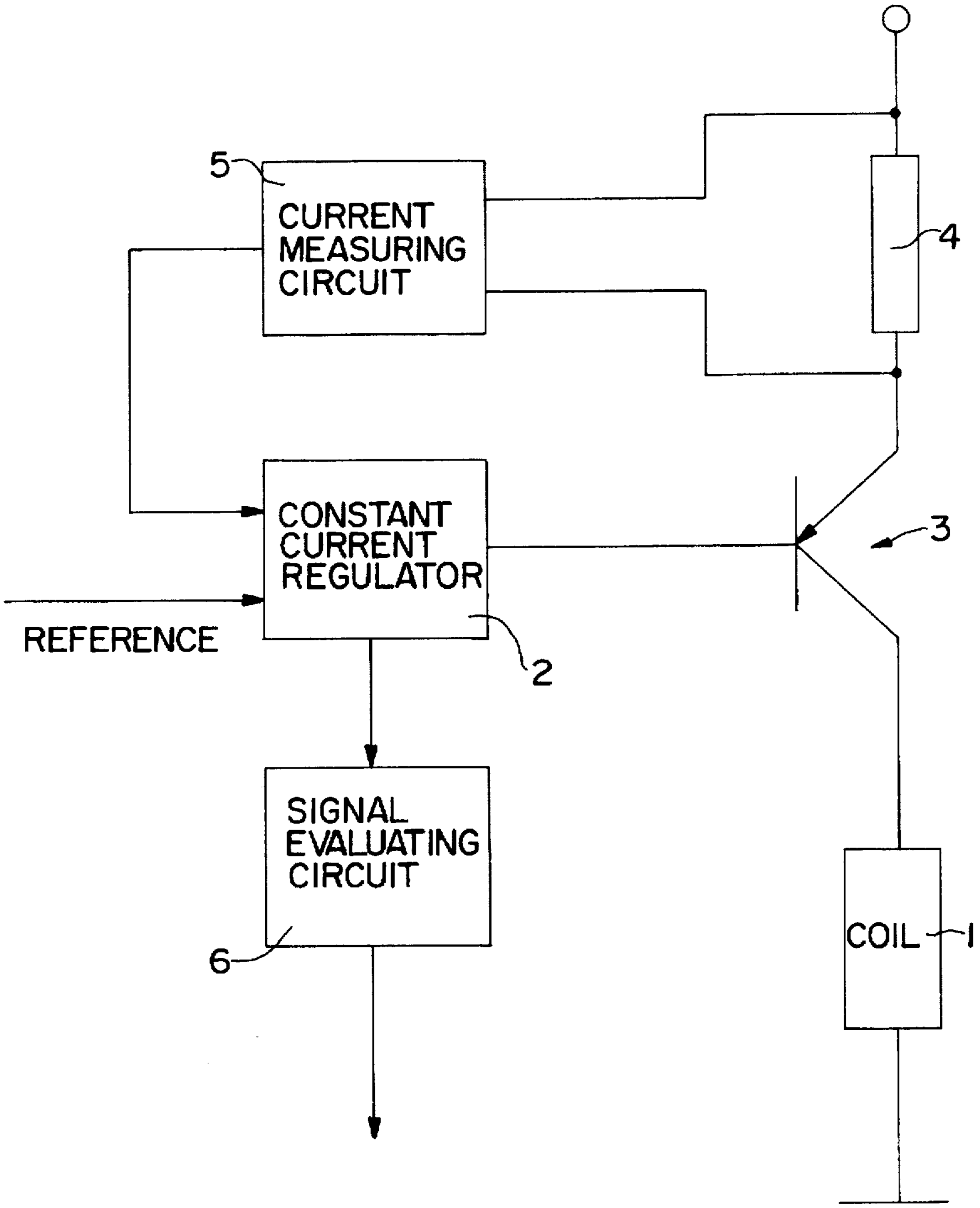
FIG. 2 is a block circuit diagram of a switching arrangement or circuit in which the identifying signal is derived from the control variable of the regulator.

The voltage peak at time $T^A$ can now be detected with the use of a special correspondingly complex circuit, not shown in detail here, and evaluated to form an identifying signal. Evaluation circuits of this type are complicated and costly. FIG. 2 shows a circuit arrangement according to the invention for an electromagnet actuator of the type generally shown in FIG. 5, in which the constant current is set with the aid of a PID regulator or controller, i.e., a controller having a proportional plus Integral plus Differential control action, prior to the anticipated impact of the armature onto the electromagnet at time $T^A$.

Because the design and operating parameters for the electromagnetic actuator are essentially known, the time of impact can theoretically be determined in advance insofar as a time $T^{A1}$ can be predetermined, at which the armature cannot yet have impacted the pole face, but is already moving in the direction of the pole face. If the exact time of impact $T^A$ is now identified using the illustrated circuit, the necessary changes in actuation of the electromagnetic actuator can be derived from this identified time of impact. If, for example, an excessively late impact is detected, the switch-on time for the current for the capturing electromagnet can correspondingly be set earlier in the next work cycle for the associated control device. On the other hand, if the armature impacts before the anticipated time of impact, the switch-on time for the capturing electromagnet can be correspondingly delayed in the next work cycle, which permits the exact time of impact to be adapted to the operating data predetermined by the control device. Further control members can also be actuated with the detected identifying signal.

In the circuit illustrated in FIG. 2, the electromagnet is represented by a coil 1, with the regulation of the coil current I taking place by means of a constant-current regulator 2 via a transistor 3 which is the actual control member for the current. A precision resistor 4, which provides a measure of the coil current to a corresponding measuring circuit 5 for processing, is further provided in the series circuit of the transistor 3 and the coil 1.

The coil current measured by the precision resistor 4 and the circuit 5, together with a preset reference value for the constant-current threshold, is fed to the regulator 2, which is configured, for example, as a PID regulator. This regulator 2 then influences the voltage of the coil 1 such that the coil current is set at a constant value. Because, as described above, the voltage is influenced by the magnetic coil 1 when the armature impacts the pole surface of the capturing magnet, and this change in voltage has a retroactive effect on the control variable at the linear regulator 2, and changes the variable, it is now possible to derive a corresponding identifying signal for the armature impact from the linear regulator 2 and to evaluate this signal with a signal-processing circuit 6 and conduct it to, for example, an electronic control device.

As can be seen from FIG. 1*c*, the coil voltage changes rapidly when the armature impacts the pole face, which has a direct, retroactive effect on the precision resistor 4. The consequential change in voltage across the resistor 4 is detected in the regulator 2 and can be tapped there, as an identifying signal, directly from the control variable for the transistor 3.

Figure 3:
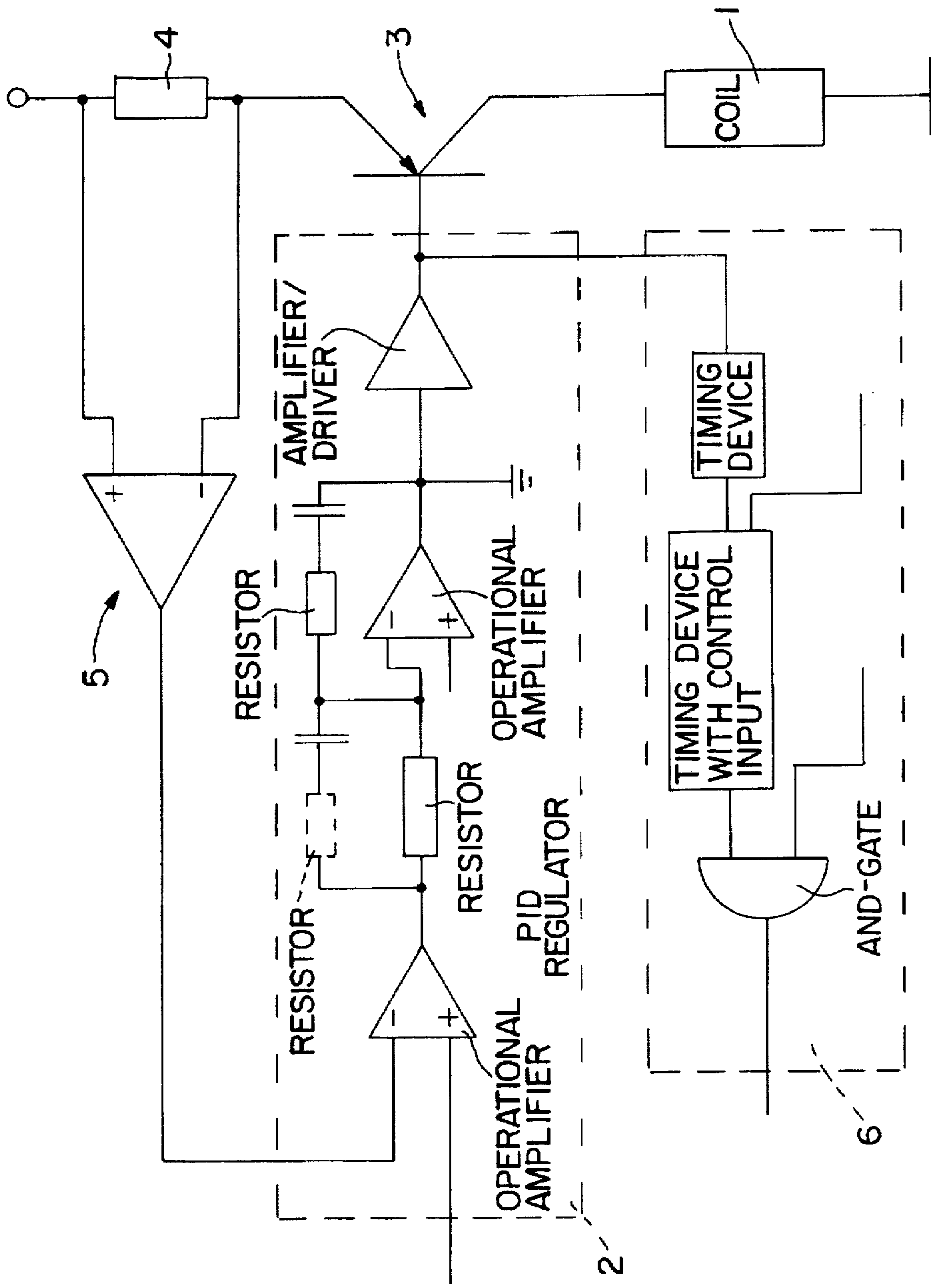
FIG. 3 is a schematic circuit diagram of a switching arrangement (circuit) having a PID regulator and in which the identifying signal is derived from the D-component of the regulator.

FIG. 3 illustrates a switching arrangement in which the linear regulator 2 is configured as a PID regulator. The circuit arrangement corresponds fundamentally to the design described in conjunction with FIG. 2. In this circuit arrangement, the control voltage for the transistor 3 appearing at the output of the regulator 2 is tapped as the identifying signal and fed to the signal evaluating circuit 6.

Figure 4:
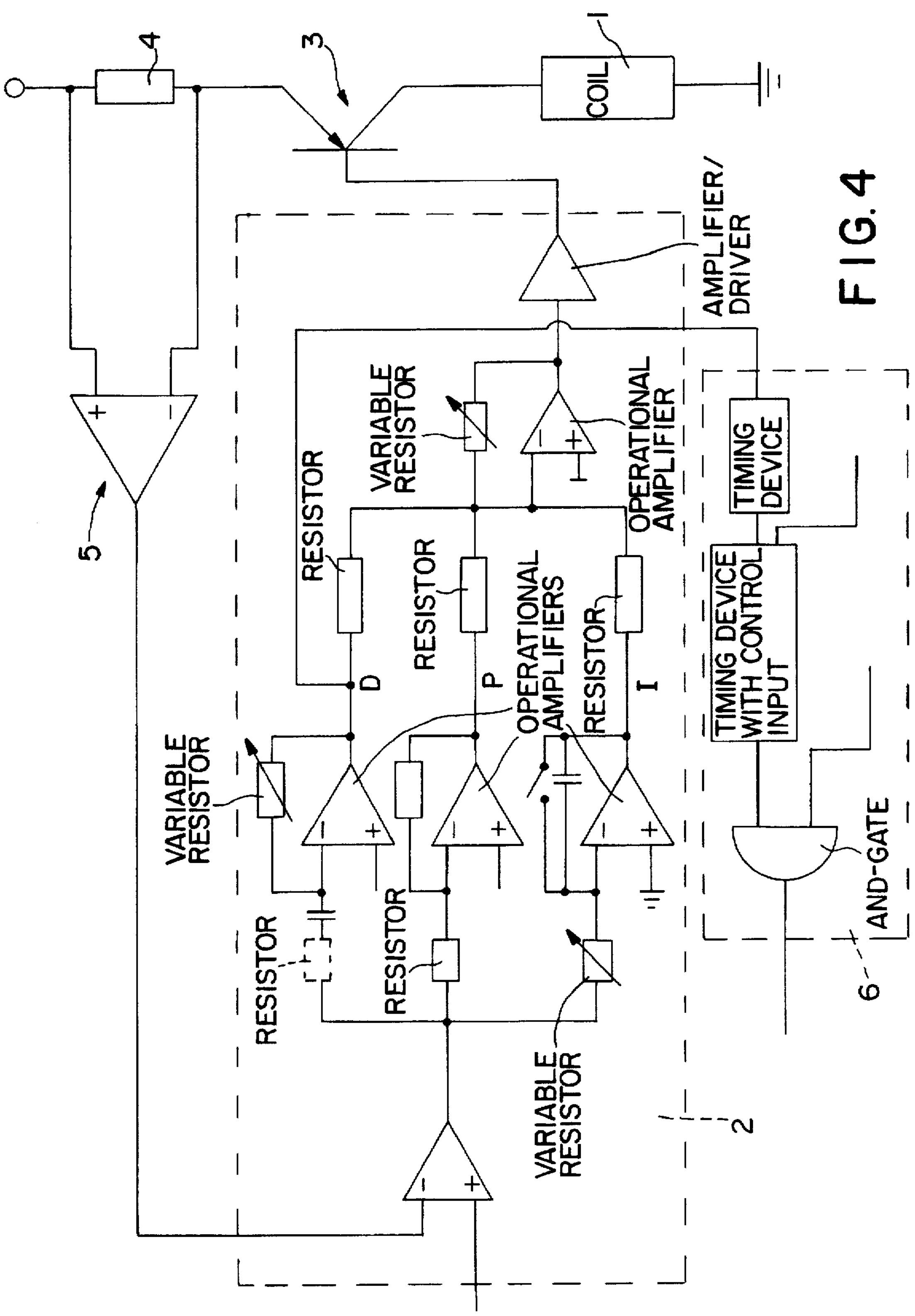
FIG. 4 is a schematic circuit diagram of switching arrangement (circuit) corresponding to FIG. 3 but with decoupled settable coefficients for the regulator.

The circuit arrangement illustrated in FIG. 4 essentially corresponds to the circuit in FIG. 3. However, in this circuit arrangement, the PID regulator circuit 2 is configured with decoupled, settable coefficients, i.e., separate circuit branches for the proportional (P), integral (I) and differential (D) components of the control characteristic. As shown, the identifying signal is derived from the circuit element or branch used for representing the D-component of the regulator and fed to the evaluating circuit 6.

The invention now being fully described, it will be apparent to one of ordinary skill in the art that any changes and modifications can be made thereto without departing from the spirit or scope of the invention as set forth herein.

What is claimed:

1. A method of controlling an electromagnetic actuator having at least one electromagnet and an armature that can be moved by the electromagnet coil generated magnetic forces in a direction counter to the force of a restoring spring associated with the electromagnet, and with the armature acting on a control element; said method comprising: initiating armature movement by supplying current to the electromagnet; measuring the current flowing through the coil of the electromagnet and providing a corresponding signal value; feeding the current value signal to a linear regulator as a control input; using the linear regulator, regulating the coil current for the electromagnet, via a control member for the coil current, to a constant value at a time prior to the anticipated time of impact of the armature on the pole face of the electromagnet; and deriving an identifying signal for armature impact from changes in the control variable of the regulator when the armature impacts during the constant-current phase.

2. A method as defined in claim 1, wherein the control variable is one of a control current and a control voltage.

3. A method as defined in claim 1, further comprising using a PID (Proportional plus Integral plus Differential regulator as the linear regulator.

4. A method as defined in claim 3, wherein said step of deriving the identifying signal comprises deriving the identifying signal from the circuit element of the PID regulator used for representing the D-component of the PID control characteristic.

* * * * *